July 24, 1962 G. J. SEGUENOT 3,045,697
VALVE DEVICES IN PARTICULAR FOR CONTROLLING
THE PRESSURE OF A HYDRAULIC CIRCUIT
Filed Jan. 25, 1960 3 Sheets-Sheet 1
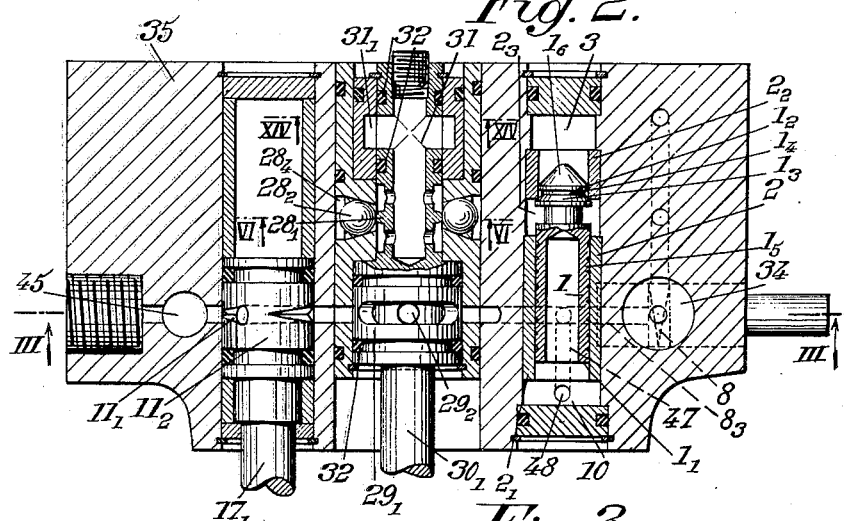
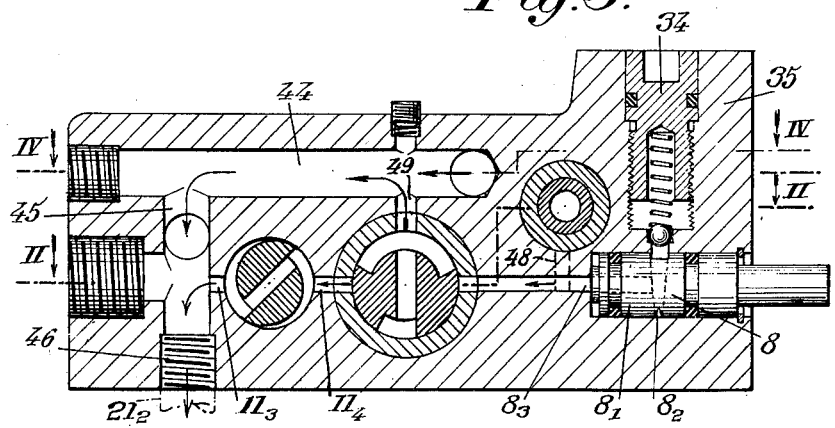
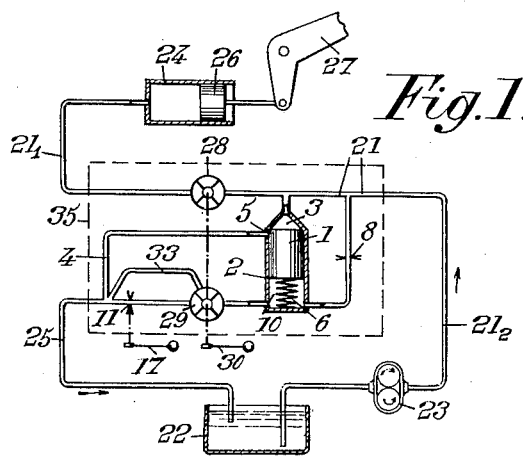

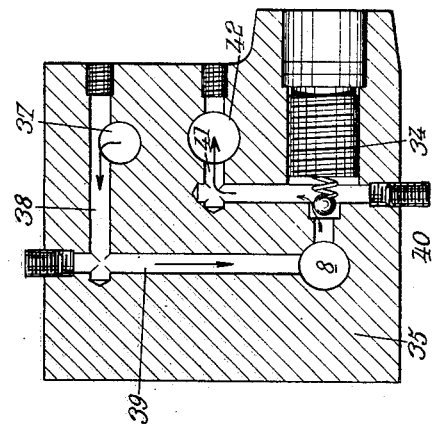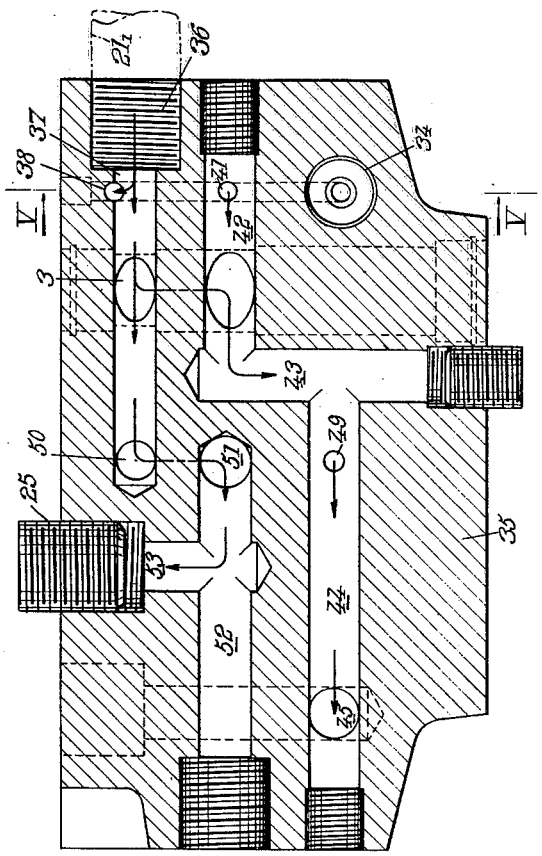

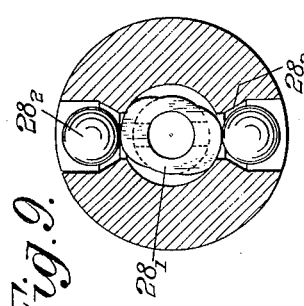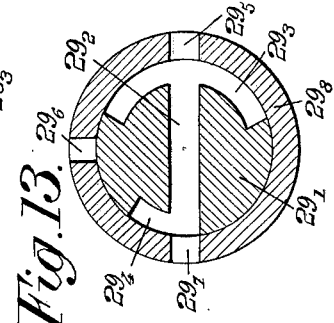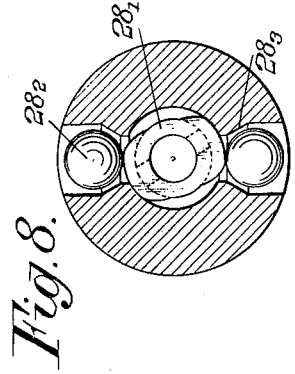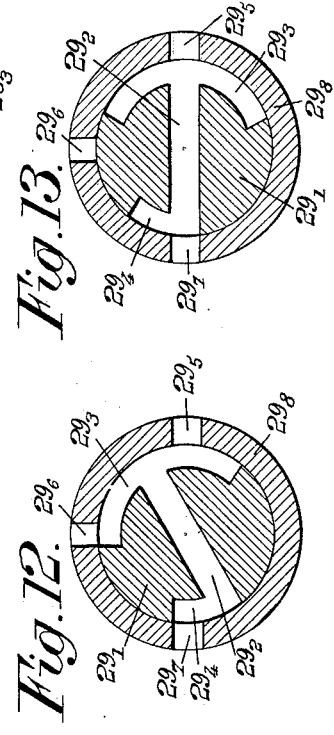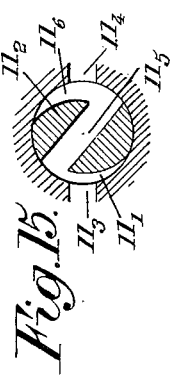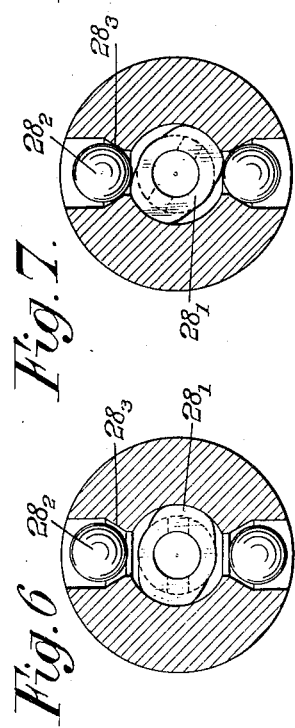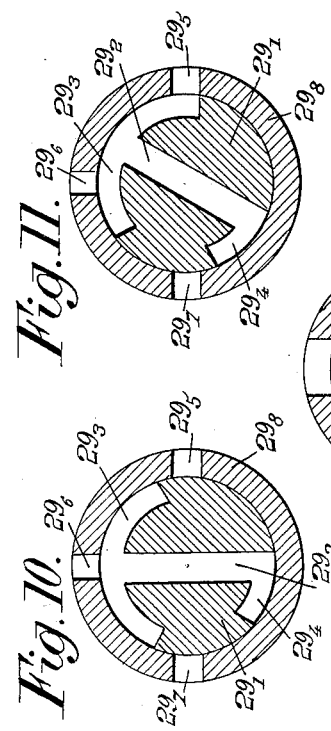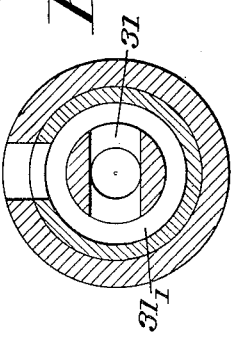

United States Patent Office 3,045,697
Patented July 24, 1962

3,045,697
VALVE DEVICES IN PARTICULAR FOR CONTROLLING THE PRESSURE OF A HYDRAULIC CIRCUIT
Gabriel Jean Seguenot, Paris, France, assignor to Sertec Societe d'Etudes et de Recherches Techniques, Paris (Seine), France, a society of France
Filed Jan. 25, 1960, Ser. No. 4,576
Claims priority, application France Jan. 27, 1959
3 Claims. (Cl. 137—609)

The present invention relates to improvements in valve devices, in particular for controlling the pressure in a hydraulic circuit, said circuit being preferably that serving to feed liquid to the cylinder of a system intended to impart an upward displacement to a tractor-drawn implement (plough, trailer or the like), these improvements coming in addition to those already described in my U.S. patent application Ser. No. 680,757 of August 28, 1957, now Patent No. 3,017,897 for "Improvements in or Relating to Valve Means for Controlling the Pressure of a Fluid System."

This prior patent application related to a device including, to control the pressure in a space supplied with liquid through a feed conduit, a valve cylinder having one end thereof in direct communication with said feed conduit, a piston acting as a valve slidable in this valve cylinder and means for resiliently urging this piston toward a position of rest where the communication between said cylinder end and a discharge conduit is cut by said piston, said communication being either open or closed by mere sliding of the piston, the other end of the valve cylinder being connected, on the one hand, through a first throttling device which is permanently open, with said feed conduit and, on the other hand, with a discharge conduit, said device being characterized by the fact that it further included a second throttling device, permanently open and located in a passage extending between said other end of the valve cylinder and said discharge conduit, the cross sectional area of said last mentioned throttling device being preferably adjustable manually.

The object of the present invention is to adapt such a device to the simple and complete control of a piston in the lifting cylinder (the above mentioned space being that limited between said piston and said lifting cylinder).

The present invention relates to the combination of a device such as above described, and comprising pump means for circulating liquid through said feed conduit toward said space, said pump means being located upstream of the points where said feed conduit is connected with said valve cylinder ends and it is characterized by the cooperation with such a device of a cut-off valve and a distributing valve both preferably controlled simultaneously by an element such as a control lever, said cut-off valve being mounted in the feed conduit between the above mentioned points and said space and said distributing valve being mounted in the passage connecting said other end of the valve cylinder with said second throttling device, the cut-off valve being adapted to perform alternately one of the two following functions either to close or to open the portion of the feed conduit in which it is mounted (said closing being in the first case made effective only if the pressure existing in said space is higher than that existing in the feed conduit) and the distributing valve being adapted to perform successively the three following functions: impossibility of any discharge from the second mentioned end of said valve cylinder, direct communication between this valve cylinder end and the discharge conduit and communication of this valve cylinder end with said second throttling device, the whole being arranged in such manner that the cut-off valve performs its first function when the distributing valve performs its first and second functions and its second function when the distributing valve performs its second and third functions.

A preferred embodiment of the present invention will be hereinafter described with reference to the accompanying drawings, given merely by way of example and in which:

FIG. 1 diagrammatically shows a device made according to the present invention for controlling the pressure of a liquid in an implement lifting cylinder.

FIG. 2 is a horizontal sectional view on the line II—II of FIG. 3 of a unit comprising the cut-off valve and the distributing valve of such a device.

FIG. 3 is a vertical section of this unit on the line III—III of FIG. 2.

FIG. 4 is a horizontal section of this unit on the line IV—IV of FIG. 3.

FIG. 5 is a vertical section of this unit on the line V—V of FIG. 4.

FIGS. 6 to 9 inclusive show in section on the line VI—VI of FIG. 2 the cut-off valve in four different working positions.

FIGS. 10 to 13 show in section on the line III—III of FIG. 2 the distributing valve in four different working positions.

FIG. 14 shows in section on the line XIV—XIV of FIG. 2 the inlet chamber of the cut-off valve.

FIG. 15 shows, in transverse section on the line III—III of FIG. 2, one of the two throttling devices above referred to.

The invention has for its object to control the pressure in a space fed with liquid from a hydraulic circuit comprising a feed conduit 21 (FIG. 1) for the circulation of oil by means of a pump 23 from a tank 22 toward the above mentioned space, which is the portion of an implement lifting cylinder 24 limited by a piston 26 operatively connected with the implement 27 to be controlled.

The above mentioned prior patent application is characterized by the following features:

There is connected with feed conduit 21, between the portion $21_2$ thereof where is located pump 23 and the feed conduit portion $21_1$ directly connected with cylinder 24, a valve the movable element of which is a piston 1 slidable in a valve cylinder 2 to control the communication between one of the end chambers of this valve cylinder, to wit chamber 3, and a discharge conduit 4 by clearing port 5 only when said piston or slide valve 1 is away from its position of rest toward which it is constantly urged by a spring 6 (the action of said spring may be replaced by the difference between the oil pressures exerted longitudinally in opposed directions respectively on two transverse walls, of different respective areas, of the piston);

Said chamber 3 is directly connected with feed conduit $21_1$;

The other end chamber 10 of valve cylinder 2 is in communication, on the one hand, with feed conduit 21 through a throttling device 8 which is permanently open and, on the other hand, with discharge conduit 25 through another throttling device 11 which is also permanently open, this last mentioned device being preferably adjustable manually through a lever 17.

In order to adapt the device thus described to a complete and particularly simple control of the displacements of lifting piston 26, a cut-off valve 28 is mounted in the portion $21_2$ of feed conduit 21 and a distributing valve 29 is mounted in the passage extending from chamber 10 to throttling device 11, both of these valves being controlled by means of the same lever 30. Cut-off valve 28 is adapted, according to its position, either to close or to open conduit $21_1$ and distributing valve 29 is capable, according to its position, to perform one of the three following functions:

(a) to prevent any discharge of liquid from chamber 10, (b) to connect this chamber 10 directly with discharge conduit 25, and (c) to connect this chamber 10 with throttling device 11.

The relative positions of the two last mentioned valves are such that conduit portion $21_1$ can be cut off from conduit portion $21_2$ only when no liquid is allowed to flow to throttling device 11 and reversely.

In the construction illustrated by FIGS. 2 and 6 to 14:

Cut-off valve 28 (FIGS. 2 and 6 to 9) includes a rotary cam $28_1$ capable, according to its position, either to move balls $28_2$ away from their seats $28_3$ or to let said balls be applied against their seats under the effect of the pressure of the oil contained in the cylinder, thus cutting off the communication. The space $28_4$ on the outside of balls $28_2$ is in communication with conduit portion $21_1$;

Distributing valve 29 (FIGS. 2 and 10 to 13) comprises a rotary cylindrical inner member $29_1$ provided with a diametral hole $29_2$ and with two grooves extending along circular arcs (one of these grooves $29_3$ extending on both sides of one of the ends of hole $29_2$, the other groove $29_4$ extending only on one side of the other of said ends) and a corresponding cylindrical sleeve $29_8$ provided with three radial holes $29_5$, $29_6$ and $29_7$ adapted to cooperate with said grooves and connected, respectively to chamber 10, discharge conduit $21_2$ through a conduit 33 (FIG. 1) and throttling device 11;

Cam $28_1$ and member $29_1$ are both rigid with a shaft $30_1$ on which is fixed the control lever 30;

The axial recess of cut-off valve 28 communicates with an intake chamber 31 in constant communication with conduit $21_1$, whatever be the angle of position of lever 30, through an annular groove $31_1$ (FIGS. 2 and 14);

Liquid-tightness is ensured by means of toroidal shaped packing rings 32.

The operation of the device when lever 30 is rotated takes place as follows, it being supposed that pump 23 runs at constant speed and that the degree of opening of throttling devices 8 and 11 has been adjusted in advance.

In the first position, called position A, of lever 30, the angular positions of the rotary valve elements are illustrated by FIGS. 6 and 10. Valve 29 is then closed, and the sum of the pressures exerted on piston 1 applies it upon its seat, thus closing discharge orifice 5. The pressure of oil admitted into chamber 31 is sufficient to move balls $28_2$ from their seats so that oil is fed to cylinder 24 and pushes back piston 26 against the action of the weight of implement 27 which is thus moved upwardly. This is the "lifting" position.

When lever 30 is in a second position, called position B, the parts are in the position illustrated by FIGS. 7 and 11. Chamber 10 is then connected with discharge conduit 25 through $29_5$, $29_3$, $29_6$ and by-pass passage 33. The pressure of oil in chamber 10 becomes very low so that piston 1 slides to clear discharge orifice 5, thus reducing the pressure in chamber 31, causing balls $28_2$ to be applied against their seats, and keeping oil entrapped in cylinder 24. This is the "stopping" position. In this position, cam $28_1$ is ready to lift balls $28_2$ if lever 30 is further rotated.

Therefore if this lever is brought into the third position C, corresponding to the position illustrated by FIGS. 8 and 12, cam $28_1$ gradually pushes balls $28_2$ away from their seats and since chamber 10 remains directly connected with discharge conduit 25, the slide valve constituted by piston 1 remains in the opening position and the oil contained in cylinder 24, under the thrust exerted by the weight of the implement on piston 26, escapes gradually through conduit 4 to discharge conduit 25. The implement moves in the downward direction. This is the "lowering" position.

Finally, in a fourth position D of lever 30 (FIGS. 9 and 13) which is very gradually reached from position C (groove $29_4$ establishing a communication between $29_5$ and $29_7$ before the communication is cut off between $29_5$ and $29_6$), balls $28_2$ are kept at a distance from their seats, but chamber 10 instead of being directly connected with discharge conduit 25 through by-pass passage 33, is then connected with throttling device 11 through $29_2$ and $29_7$ (groove $29_3$ being no longer located opposite orifice $29_6$). This is the "working" position which corresponds to the operation described in the above mentioned prior patent application.

In other words, when lever 30 is in position D, the pressure acting upon lifting piston 26 depends upon the values of the two throttling devices 8 and 11 and practically not upon the viscosity of the oil flowing through the circuit, which viscosity is variable with the temperature.

As a matter of fact, it can be said with a sufficient approximation that the pressure drop $dP$ of a liquid flowing through a throttling device having a passage the cross sectional area of which is S is given, as a function of the flow rate of the liquid Q passing through said throttling device, by the formula:

$$dP = K\frac{Q^2}{S^2}$$

K being a coefficient variable according to the viscosity of the liquid.

When piston 1 is practically balanced and permits a small leak of liquid by being at a very small distance from its seat (a condition which is complied with when the device is in the "working" state), the pressure drop $dP_1$ of the liquid flowing past the first throttling device 8 is substantially constant and equal to the pressure with which spring 6 urges slide valve 1 toward closing position. For a given value of the cross sectional area $S_1$ of this throttling device, the flow rate of liquid $Q_1$ passing therethrough is therefore practically constant.

Now, this flow rate is that applied to the second throttling device 11. It follows that the pressure drop produced by this second throttling device is:

$$dP = K\frac{Q_1^2}{S_2^2}$$

and since:

$$Q_1^2 = \frac{S_1^2 dP_1}{K}$$

then:

$$dP_2 = \frac{K}{K} \times \frac{S_1^2}{S_2^2} dP_1$$

so that coefficient K is eliminated.

To sum up, for given values of $S_1$ and $S_2$, $dP_2$ remains practically constant, same as the value $P = dP_1 + dP_2$ of the pressure applied to the piston 26 of the lifting device.

Experience teaches in fact that for a value of pressure P which is to vary within a rather large range and which may be as high as 50 kg. per cm.$^2$ or even higher, the pressure variations do not exceed some units percent when the temperature of oil varies from 30 to 110° C.

A preferred construction of piston 1 and cylinder 2 is as follows:

Cylinder 2 includes two cylindrical sleeves $2_1$ and $2_2$ (FIG. 2) separated longitudinally from each other by an annular chamber $2_3$ in permanent communication with the discharge conduit, the sleeve $2_1$ interposed between said chamber $2_3$ and chamber 10 having an inner diameter slightly greater than that of the sleeve $2_2$ interposed between chamber $2_3$ and chamber 3.

Piston 1 includes a sleeve $1_1$ and a cylindrical extension $1_2$ adapted to slide respectively in sleeve $2_1$ and sleeve $2_2$ and separated by a conical surface $1_3$ adapted to fit in liquid-tight contact upon the corresponding edge of sleeve $2_2$ which form a valve seat, said conical surface $1_3$ being preferably connected with extension $1_2$ through a portion $1_4$ of reduced diameter.

According to its longitudinal position in cylinder 2, slide valve 1 may thus:

Either establish a free communication between chambers 3 and $2_3$ when extension $1_2$ is at a distance from sleeve $2_2$;

Or permit a very slight leakage of liquid between these two chambers when said extension $1_2$ is engaged in said sleeve $2_2$;

Or again stop the communication between chambers 3 and $2_3$ when the conical surface $1_3$ is applied against its seat.

Furthermore, advantageeously, in order to increase the sensitivity of control, that is to say to permit displacements of piston 1 for very small variations of the sum of the pressures exerted longitudinally thereon, there is provided, in the external cylindrical surface of sleeve $1_1$, a plurality of annular grooves $1_5$ which permit an excellent circumferential balancing thereof.

Furthermore, the axial length of extension $1_2$ is made relatively small, most of the guiding action being ensured by the cooperation of sleeve $1_1$ with its housing, the length of these two last mentioned elements being made relatively great for this purpose.

In order to reduce the pressure drop of the liquid flowing past slide valve 1, there is provided at the end of said slide valve opening into chamber 3 a conical head $1_6$ which facilitates the flow of the liquid about said slide valve.

A safety valve such as indicated at 34 (FIGS. 2 and 3), branched on throttling device 8, prevents the production of excessive pressures in the circuit and in particular in chamber 10 and in chamber 3.

Of course, this safety valve may be adjusted at will, for instance by screwing.

In a likewise manner, it is possible to adjust at will the value of the opening supplied by throttling device 8, for instance, by modifying the angular position of the body $8_1$ thereof so as to bring opposite the liquid inlet a gradually decreasing portion of a groove $8_2$ of variable width provided circumferentially in said body and communicating radially with an axial outlet $8_3$ (FIGS. 2 and 3).

The rotary portion of device 11 (FIGS. 2 and 15) mounted on shaft $17_1$ of lever 17 is also provided with a groove of variable width $11_1$ formed circumferentially in a rotating body $11_2$, this groove being adapted to cooperate with the outlet $11_3$ of this throttling device and to communicate with inlet $11_4$ through a diametral hole $11_5$ and a second circuferential groove $11_6$ preferably wider than groove $11_1$.

The second throttling device, to wit 11, might also consist of a valve loaded by means of a spring, the strength of this spring being adjustable by a control member such as a lever analogous to lever 17. The cross sectional area of opening of this throttling device then depends upon the position of the parts when the action of the spring is balanced by the dynamic pressure of oil flowing through the valve.

According to a modification, the rotational displacements of shaft $30_1$, instead of being controlled by lever 30, might be controlled by a part, such as an equalizer bar, having its position controlled both by a control member such as a lever analogous to lever 30 and by the arms 27 of the implement linkage, in particular in the manner described in the patent application Ser. No. 672,395 of July 17, 1957, now abandoned for "Improvements Relating to Means for Controlling and Regulating the Working Conditions of Implements, of the Plough Type, Coupled to Tractors."

With such an arrangement, for a given position of said control member (within a range of limited amplitude) balancing of the arms (stopping position above referred to) is obtained only for a well determined position of these arms. The position of these arms therefore depends upon that of said control member when the latter is within said range. Of course, in such a modification, said control member must be capable of occupying a position (outside of said range) for which the arms are not located in accordance with the position of said control member, the shift of load (working state above referred to) being then maintained independently of the position of the arms, which can then "float."

According to still another modification relative to the case where the linkage is of the 3 point type, as referred to in the prior application cited in the preceding paragraph the rotation of throttling device 11 might depend upon various actions exerted on said linkage during the work, in particular upon the compression or pulling forces exerted on the upper part (or "third" point) of this linkage. In this modification, the distributing valve might be controlled in any suitable manner, by a lever such as 30 or by an equalizer bar as above referred to.

In a likewise manner, the displacements of throttling device 11 might be made dependent upon the position of the arms 27 of the linkage.

FIGS. 2 to 5 show the bores provided in solid body 35 to form the necessary communications, the main oil stream being indicated by arrows: this oil stream coming from pump 23 through conduit $21_2$ (FIG. 1), enters at 36 into a bore 37 (FIG. 4) from which it is sent:

First, through holes 38 and 39 (FIG. 5) to throttling device 8 and thence either to discharge conduit 25 past safety valve 34, holes 40, 41, 42 (FIG. 5), 43, 44, 45 (FIG. 4) and outlet 46 (FIG. 3) or to chamber 10 through outlet $8_3$ (FIGS. 2 and 3) and holes 47 and 48, said outlet $8_3$ leading to distributing valve 29 which, according to its position, sends oil either through hole 49 to hole 44 or through throttling device 11 to the above mentioned hole 45;

Secondly, directly to chamber 3 which extends across bore 37 and thence when the slide valve is opened to the above mentioned hole 42 (FIG. 4) and Thirdly, through hole 50, to chamber 31 and thence when balls $28_2$ are moved away from their seats toward conduit $21_1$ through holes 51, 52 and 53 (FIG. 4).

Thus, there is finally obtained a device which permits of obtaining by mere displacement of control device 30 the lifting and lowering of implement 27, its holding at any desired height and the application on lifting piston 26 of a practically constant pressure by means of a variable volume of oil, the value of said pressure being easily modified by displacement of member 17.

This last mentioned feature (constant pressure exterted by a variable volume of oil) is particularly advantageous when implement 27 carries a plough and it is desired to keep this plough at a constant depth by constantly shifting to the tractor which carries cylinder 24 an optimum portion of the forces exerted on the plough, for the purpose of increasing in the best possible conditions the adhesion of this tractor on the ground.

What I claim is:

1. A device for controlling the pressure of a liquid in a space which comprises, in combination, a conduit leading from a pressure source to said space to feed liquid under pressure toward said space, a cylinder, a piston slidably mounted in said cylinder and forming two end chambers therein, direct communication means between one of said end chambers and a first point of said conduit, communication means between the other of said end chambers and a second point of said conduit upstream of said first point, said second mentioned communication means including a permanently open throttling device inserted therein, a cut-off valve inserted in said conduit between said first point thereof and said space, a discharge conduit in communication with a point of the side wall of said cylinder, said piston forming a slide valve to control the communication between said first mentioned end chamber and said discharge conduit, resilient means interposed between said piston and said cylinder to urge said piston toward a position of rest where it closes this communication between said first mentioned end chamber and said discharge conduit, a passage extending between said second mentioned end chamber and said discharge conduit, a permanently open throttling device inserted in said passage, a distributing valve mounted in said passage between said second mentioned end chamber and said second mentioned throttling device, a by-pass passage extending directly between said distributing valve and said discharge conduit, said cut-off valve being capable of performing either of two functions, to wit either to close or to open the portion of said conduit in which it is inserted, and in such manner that closing is effective only if the pressure in said space is higher than that existing in said conduit upstream of said cut-off valve, said distributing valve being capable of performing one of the three following functions, to cut off said second mentioned end chamber from both said second throttling device and said by-pass passage, to place said second end chamber in communication with said by-pass passage but not with said second throttling device, and to place said second end chamber in communication with said second throttling device but not with said by-pass passage, and common means for operating both of said valves so that said cut-off valve performs its first function when said distributing valve performs its first or second function and said cut-off valve performs its second function when said distributing valve performs its second or third function.

2. A device according to claim 1 in which said cut-off valve comprises valve seats, balls adapted to cooperate with said valve seats to perform either of said two functions and a rotary cam capable according to its position either to move said balls away from said valve seats or to allow said balls to be applied against said valve seats under the effect of the pressure of the liquid contained in said space.

3. A device according to claim 1 in which both of said valves are mounted on a common shaft and a lever fixed to said shaft transversely thereto to control the position thereof.

References Cited in the file of this patent
UNITED STATES PATENTS 2,544,972　　Worthington et al. _____ Mar. 13, 1951
2,679,263　　Kiser et al. _____ May 25, 1954